US011084017B1

(12) United States Patent
Lazarev et al.

(10) Patent No.: US 11,084,017 B1
(45) Date of Patent: Aug. 10, 2021

(54) LAZAREV REACTOR 3: CONTINUOUS PRODUCTION PROCESS OF TWO-DIMENSIONAL POLYMER TUBES

(71) Applicant: 86 Solar Inc., Palo Alto, CA (US)

(72) Inventors: Alexander P. Lazarev, Irvine, CA (US); Pavel I. Lazarev, Menlo Park, CA (US)

(73) Assignee: 86 Solar Inc., Palo Alto, CA (US)

( * ) Notice: Subject to any disclaimer, the term of this patent is extended or adjusted under 35 U.S.C. 154(b) by 0 days.

(21) Appl. No.: 16/882,194

(22) Filed: May 22, 2020

(51) Int. Cl.
*B01J 19/24* (2006.01)
*B01J 4/00* (2006.01)

(52) U.S. Cl.
CPC ........... *B01J 19/2475* (2013.01); *B01J 4/007* (2013.01); *B01J 19/2415* (2013.01); *B01J 19/2485* (2013.01); *B01J 2204/005* (2013.01); *B01J 2219/00033* (2013.01); *B01J 2219/00162* (2013.01); *B01J 2219/00168* (2013.01); *B01J 2219/2424* (2013.01)

(58) Field of Classification Search
CPC .. B01J 19/2475; B01J 19/2415; B01J 19/244; B01J 19/2485; B01J 2219/00033; B01J 2219/00162; B01J 2219/00168; B01J 2219/2424; B01J 4/007; B01J 2204/005
See application file for complete search history.

(56) References Cited

U.S. PATENT DOCUMENTS

| 5,116,506 A * | 5/1992 | Williamson | ........... C12M 23/34 210/610 |
| 2018/0171086 A1* | 6/2018 | Sun | ............................. C08J 5/18 |

* cited by examiner

*Primary Examiner* — Lessanework Seifu
(74) *Attorney, Agent, or Firm* — David R. Stevens; Stevens Law Group

(57) ABSTRACT

The present disclosure provides device comprising a cylindrical reaction vessel having one or more permeable cylindrical membranes disposed therein separating the cylindrical reaction vessel into at least a first portion and a second portion, wherein the one or more permeable cylindrical membranes are configured to permit first reactants from a first solution in the first portion or reactants from a second solution in the second portion to percolate or seep to a reaction zone proximate a surface of the one or more cylindrical membranes. A lifting device (mechanism) located above the first portion of the cylindrical reaction vessel configured to continuously draw a preform two-dimensional polymer tube formed by continuous reaction of the first and second reactants out from the reaction zone.

24 Claims, 3 Drawing Sheets

Ｕ S 11,084,017 B1

LAZAREV REACTOR 3: CONTINUOUS PRODUCTION PROCESS OF TWO-DIMENSIONAL POLYMER TUBES

FIELD OF THE DISCLOSURE

The present disclosure relates generally to process equipment for the continuous production process of organic tubes. More precisely the present invention relates to chemical reactor device for industrial continuous production of polymeric tubes with two-dimensional monolayer and multilayer porous polymer cylindrical walls.

BACKGROUND

Two-dimensional polymers that are laterally infinite, one atom- or monomer-unit thin, free-standing, covalent networks with long-range order along two orthogonal directions have attracted intense attention in recent years due to their wide applications in electronics, membrane and sensing (see, Novoselov, K. S. et al., "A roadmap for graphene", Nature 490, 192-200 (2012)). However, the synthesis of graphene involves high-energy procedures, such as chemical vapour deposition (CVD), epitaxial growth and pyrolysis (see, Yang, W. et al., "Epitaxial growth of single-domain graphene on hexagonal boron nitride", Nat. Mater. 12, 792-797 (2013)). The harsh experimental conditions preclude molecular design of graphene on demand. As a first step to rationally synthesize two-dimensional polymers two-dimensional monolayers of porphyrin nanostructures and porous graphene have been constructed on crystalline metal surfaces through Ullmann coupling under ultra-high vacuum conditions (see, Lafferentz, L. et al., "Controlling on-surface polymerization by hierarchical and substrate-directed growth", Nat. Chem. 4, 215-220 (2012) and Bieri, M. et al., "Porous graphenes: two-dimensional polymer synthesis with atomic precision", Chem. Commun. 45, 6919-6921 (2009)). However, the synthesized two-dimensional monolayers are limited to a few nanometers in size, and their release from the underlying substrate is challenging.

As an alternative approach, two-dimensional polymers have been recently achieved through ultraviolet initiated cycloaddition of anthracene-based monomers either in lamellar organic crystals followed by exfoliation into individual layers or at an air-water interface of a Langmuir-Blodgett (LB) film. See, e.g., Kissel, P. et al., "A two-dimensional polymer prepared by organic synthesis", Nat. Chem. 4, 287-291 (2012), Kissel, P., Murray, D. J., Wulftange, W. J., Catalano, V. J. and King, B. T. See also, e.g., Kissel P. et al., "A nanoporous two-dimensional polymer by single-crystal-to-single-crystal photo polymerization", Nat. Chem. 6, 774-778 (2014)). The exfoliation method provides synthetic two-dimension polymers with limited lateral size, typically ranging from a few hundred nanometers to several micrometers, which in the end are determined by crystal sizes. Hafeesudeen Sahabudeen, et al., ("Wafer-sized multifunctional polyimine-based two-dimensional conjugated polymers with high mechanical stiffness", NATURE COMMUNICATIONS|7:13461|DOI: 10.1038/ncomms13461, pp. 1-8,|www.nature.com/naturecommunications) show the successful preparation of porphyrin containing monolayer and multilayer two-dimensional polymers through Schiff-base poly-condensation reaction at an air-water and liquid-liquid interface, respectively. Both the monolayer and multilayer two-dimensional polymers have crystalline structures as indicated by selected area electron diffraction. The monolayer two-dimensional polymer has a thickness of 0.7 nm with a lateral size of 4-inch wafer, and it has a Young's modulus of 267±30 GPa. Notably, the monolayer two-dimensional polymer functions as an active semiconducting layer in a thin film transistor, while the multilayer two-dimensional polymer from cobalt-porphyrin monomer efficiently catalyzes hydrogen generation from water. This work presents an advance in the synthesis of novel two-dimensional materials for electronics and energy-related applications.

Covalent organic frameworks (COFs) have emerged as a promising light-harvesting module for artificial photosynthesis and photovoltaics. For efficient generation of free charge carriers, the donor-acceptor (D-A) conjugation has been adopted for two-dimensional (2D) COFs recently. In the 2D D-A COFs, photoexcitation would generate a polaron pair, which is a precursor to free charge carriers and has lower binding energy than an exciton. Although the character of the primary excitation species is a key factor in determining optoelectronic properties of a material, excited-state dynamics leading to the creation of a polaron pair have not been investigated yet. Authors Tae Wu Kim et al. investigate the dynamics of photogenerated charge carriers in 2D D-A COFs by combining femtosecond optical spectroscopy and non-adiabatic molecular dynamics simulation. See "Ultrafast charge transfer coupled with lattice phonons in two-dimensional covalent organic frameworks", NATURE COMMUNICATIONS|(2019) 10:1873|https://doi.org/10.1038/s41467-019-09872-w|www.nature.com/naturecommunications). From this investigation, the authors of this article elucidate that the polaron pair is formed through ultrafast intra-layer hole transfer coupled with coherent vibrations of the 2D lattice, suggesting a mechanism of phonon-assisted charge transfer.

However, the aforementioned articles discussed above did not present or describe the technological equipment that will allow us to switch to the industrial production of polymer tubes with two-dimensional monolayer and multilayer porous polymer cylindrical walls. It is within this context that aspects of the present disclosure arise.

SUMMARY

The present disclosure overcomes the marked drawbacks in industrial production of two-dimensional monolayer and multilayer porous polymers based on polymerization of monomeric reagents Certain aspects of the present disclosure provide a device comprising a cylindrical reaction vessel having one or more permeable cylindrical membranes disposed therein separating the cylindrical reaction vessel into at least a first portion and a second portion, wherein the one or more permeable cylindrical membranes are configured to permit first reactants from a first solution in the first portion or reactants from a second solution in the second portion to percolate or seep to a reaction zone proximate a surface of the one or more cylindrical membranes. A lifting device (mechanism) located above the first portion of the cylindrical reaction vessel configured to continuously draw a preform two-dimensional polymer tube formed by continuous reaction of the first and second reactants out from the reaction zone.

Further, aspects of the present disclosure provide a device where the one or more permeable cylindrical membranes include a first permeable cylindrical membrane and a second permeable cylindrical membrane inside of the reaction cylindrical vessel that separate the reaction vessel into the first portion and the second portion, where the first permeable cylindrical membrane is coaxially located inside of the second permeable cylindrical membrane such that an inter-membrane space forms the reaction zone, wherein the first permeable cylindrical membrane is configured to permit first reactants from a first solution to percolate or seep from the first portion into the inter-membrane space and wherein the second permeable cylindrical membrane is configured to permit second reactants from a second solution to percolate or seep from the second portion into the inter-membrane space. The lifting device (mechanism) is located above the first portion of the cylindrical reaction vessel and is configured to continuously draw the preform two-dimensional polymer tube formed by continuous reaction of the first and second reactants out from the inter-membrane space.

Additional aspects of the present disclosure provide a method for continuous creation of the two-dimensional polymer tube comprising: reacting a first solution and a second solution, wherein the first solution includes a first reactant and the second solution includes a second reactant wherein the first reactant and second reactant are selected to continuously generate a polymerization reaction in at least two dimensions when in contact with each other by percolating the first or second reactant through a permeable cylindrical membrane to a reaction zone proximate a surface of the one or more permeable cylindrical membranes; contacting a polymerized preform of the polymer tube formed by continuous reaction of the first and second reactants in the reaction zone with a lifting device (mechanism); and using the lifting device (mechanism) to continuously draw the polymerized preform polymer tube from the reaction zone of the cylindrical reaction vessel.

BRIEF DESCRIPTION OF THE DRAWINGS

These and various other features and advantages of the present invention will become better understood upon reading of the following detailed description in conjunction with the accompanying drawings and the appended claims provided below, where:

DETAILED DESCRIPTION

Figure 1:
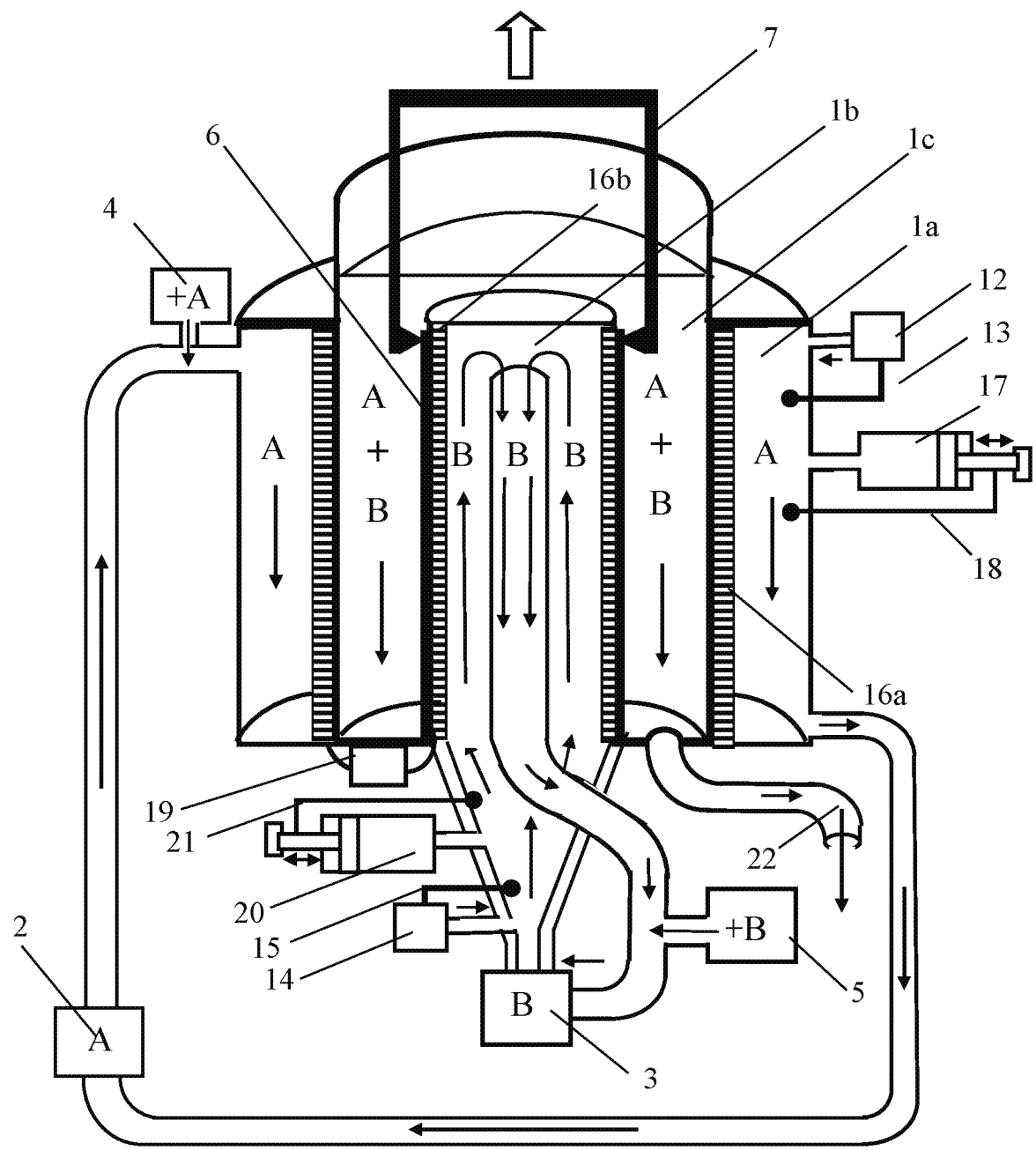
FIG. 1 is a schematic diagram of the main structural elements of a device having a first and second permeable cylindrical membranes according to aspects of the present disclosure.
Figure 2A:
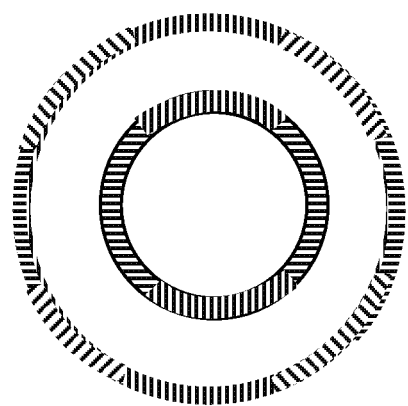
FIGS. 2a-2d schematically show the shape of the cross-sections of the porous permeable cylindrical membranes of device having a first and second permeable cylindrical membrane according to aspects of the present disclosure.
Figure 2B:
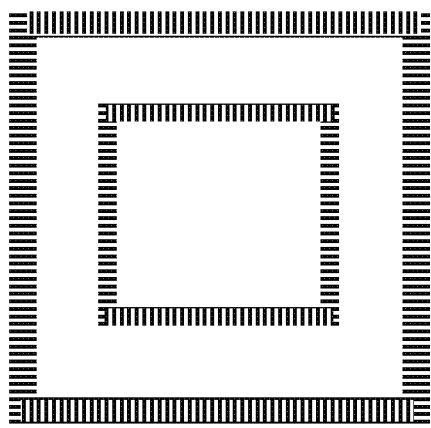
Figure 2C:
Figure 2D:
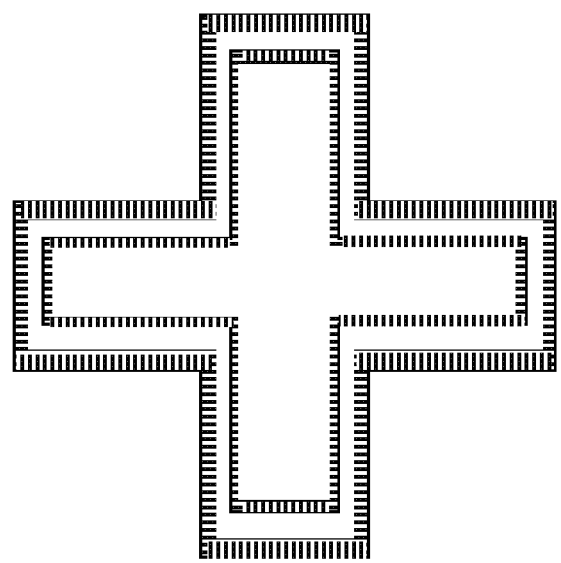

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The general description of the present invention having been made, a further understanding can be obtained by reference to the specific embodiments, which are given herein only for the purpose of illustration and are not intended to limit the scope of the appended claims.

The present disclosure provides the device as disclosed hereinabove. In one implementation of the disclosed reactor, the first permeable cylindrical membrane and the second permeable cylindrical membrane are porous. The first permeable cylindrical membrane is characterized by a pore size chosen to selectively allow the first reactants in the first solution through the first permeable cylindrical membrane. The second permeable cylindrical membrane is characterized by a pore size chosen to selectively allow the second reactants in the second solution through the second permeable cylindrical membrane respectively. The pore size of the first permeable cylindrical membrane prevents the second reactants in the second solution from traversing through the first permeable cylindrical membrane and the pore size of the second cylindrical membrane prevents the first reactants in the first solution from traversing through the second permeable cylindrical membrane. In another implementation of the disclosed reactor, the first portion and the second portion are isolated from each other. In yet another implementation of the present disclosure, the device further comprises a first liquid circulation loop and a second liquid circulation loop. The first liquid circulation loop is configured to circulate the first solution through the inside of the first portion of the cylindrical reaction vessel and the second liquid circulation loop is configured to circulate the second solution through the inside of the second portion of the cylindrical reaction vessel and the first and second liquid circulation loops operate separately from one another. In still another implementation of the present disclosure, the device further comprises a first container coupled to the first portion and a second container coupled to the second portion. The first container is configured to hold the first solution and the second container is configured to hold the second solution and the first and second containers are configured to provide their contents to the first portion and second portion respectively. In one implementation of the present disclosure, the device further comprises an evaporator configured to remove solvent vapor that is generated during drying of the preform of the polymer tube. The device further comprises a dryer configured to dry the preform of the polymer tube. Said dryer is located above the first portion of the cylindrical reaction vessel. The evaporator may for example and without limitation be a fan, a combination heating element and fan or the like. The dryer may include an extractor fan and condenser tubes connected the reaction vessel and configured to condense evaporated solvent and return the condensed solvent back to the reaction vessel. The dryer may be for example an oven, or fan configured to dry out the polymer film. In another implementation of the disclosed reactor, the lifting device (mechanism) further comprising clamping rollers configured to clamp onto the preform two-dimensional polymer tube and continuously pull the preform polymer tube through a drying chamber and raise the edge of the polymer tube above the cylindrical reaction vessel. In yet another implementation of the present disclosure, the device further comprises a first viscosity regulation container and a first viscosity sensor coupled to the first portion and a second viscosity regulation container and second viscosity sensor coupled to the second portion. The first and second viscosity regulation containers are configured contain and add to the first and second portions inert substances chosen to regulate the viscosity of the first or second solution to ensure the laminar flow of the solutions based on information from the viscosity sensors. In still another implementation of the present disclosure, the device further comprises a first pressure control device and a first pressure sensors coupled to the first portion and a second pressure control device and a second pressure sensor coupled to the second portion wherein the pressure control devices are configured to regulate the pressure of the first and second solution based on information from the pressure sensors. The pressure control system may include for example and without limitation, solution relief valves, syringes and/or pumps configured to introduce additional solution to a portion of the reaction chamber. Alternately the pressure control system may include for example and without limitation gas bladders gas introduction/relief valves or other device configured to decrease the volume of a portion of the reaction vessel. In one implementation of the present disclosure, the device further comprises an acoustic wave generator configured to excite the one or more permeable cylindrical membranes.

In another aspect, the present disclosure provides the method for continuous creation of the two-dimensional polymer tube as disclosed above. In one embodiment of the disclosed method a wall of the polymer tube is a multilayer porous polymer cylindrical film where each subsequent cylindrical layer is oriented relative to the previous cylindrical layers due to π-π-interaction. In another embodiment of the present invention the disclosed method further comprises drying the preform of the polymer tube and evaporating the solvent vapor generated during drying of the preform of the polymer tube with an evaporator. In still another embodiment of the present invention the disclosed method further comprises a lifting device (mechanism) with clamping rollers to continuously pull the preform two-dimensional polymer tube through a drying chamber and raise the edge of the two-dimensional polymer tube above the cylindrical reaction vessel. In one embodiment of the disclosed method the chemical reaction in the intermembrane space between the components of reaction is continuously carried out due to the chemical bonds selected from list composing covalent, ionic, and coordination bonds. In another embodiment of the disclosed method the first and the second solution include percolating the first reactant from the first solution through a first cylindrical membrane and percolating the second reactant from the second solution through a second cylindrical membrane to an inter-membrane space between the first and second cylindrical membranes that serves as the reaction zone. In still another embodiment of the disclosed method the first solution and second solution contain photovoltaic donor and acceptor respectively reagents necessary for the formation of donor-bridge-acceptor structures, followed by the formation of the polymer tube. In another embodiment of the present invention the disclosed method further comprises measuring the viscosity of the first and second solutions and adding inert substances to the reaction wherein the inert substances are chosen to regulate the viscosity of the first or second solution to ensure the laminar flow of the solutions based on the viscosity measurement. In one embodiment of the disclosed method the first reactant includes 5,10,15,20-tetrakis (4-aminophenyl)-21H,23H-porphine and the second reactant includes 2,5-dihydroxyterephthalaldehyde. In another embodiment of the disclosed method a shape of the cross-section of the polymer tube is selected from the list comprising circle (round), square, rectangular, oval, flat-oval and cross-shaped. In still another embodiment of the present invention the disclosed method further comprises control of pressure in the first reaction portion and the second reaction portion for optimization of membranes work. In one embodiment of the present invention the disclosed method further comprises exciting the membranes with an acoustic wave generator.

FIG. 1 schematically shows the functional purpose of the main structural elements of device. This embodiment of a chemical reactor comprises a cylindrical reaction vessel separated onto three coaxially arranged relative to each other cylindrical portions 1a, 1b and 1c, containing solutions A, B and a mixture of solutions A and B, respectively. External cylindrical wall of the first portion 1a is a permeable cylindrical membrane 16a. Similarly, the inner cylindrical wall of the second portion 1b is a permeable cylindrical membrane 16b. The first permeable cylindrical membrane 16a and the second permeable cylindrical membrane 16b are porous. By way of example, and not by way of limitation, these cylindrical membranes may be made of polymer material, ceramics, fiberglass. By way of example, and not by way of limitation, cross sections of cylindrical membranes can take different shapes: round, square, rectangular, or cross-shaped, and the like (see, FIGS. 2a, 2b, 2c and 2d). A cylindrical polymer tubing (tube) 6 is formed in the space between these cylindrical membranes.

The solution A contains a monomer reagent of the first type, dissolved in a liquid solvent of the first type. The solution B contains a monomer reagent of the second type, dissolved in a liquid solvent of the second type. Unit 2 circulates the solution A in the reactor. Accordingly, unit 3 circulates the solution B in the reactor. First container 4 coupled to the first cylindrical portion and second container 5 coupled to the second cylindrical portion are used for control of concentration of reagents in solutions A and B and reagents are replenished in these containers in order to keep concentration of reagents in level that is optimal for the tubing (tube) growth.

The formation of the porous polymer cylindrical tubing 6 occurs due to the seepage (percolation) of a solution A containing monomer reagent of the first type through the pores of the cylindrical membrane 16a and the seepage (percolation) of a solution B containing monomer reagent of the second type through the pores of the cylindrical membrane 16b, to the intermembrane space where both solutions A and B form of chemical bonds between the mentioned reagents, i.e., covalent bonds, ionic bonds, coordination bonds, and the like.

The first permeable cylindrical membrane 16a is characterized by a pore size chosen to selectively allow the first reactants in the first solution A through this membrane. The second permeable cylindrical membrane 16b is characterized by a pore size chosen to selectively allow the second reactants in the second solution B through this membrane. The pore size of the first permeable cylindrical membrane 16a prevents traversing through it the second reactants of the second solution B and the pore size of the second cylindrical membrane 16b prevents traversing through it the first reactants of the first solution A.

It should be noted that device of the type described herein allows the formation of multilayer cylindrical polymer tubing of any thickness. In this case, each subsequent layer is formed due to the fact that monomer reagents of first and second type are able to penetrate through the pores of the membrane 16a and 16b and the pores of previously formed cylindrical layers. Each subsequent cylindrical layer may be oriented relative to the previous cylindrical layers due to π-π-interaction. By-products of two-dimensional synthesis and a mixture of solutions A and B formed in the intermembrane space and in cylindrical portion 1c is removed from the reactor using a drain 22.

Schematically shown lifting device 7 is designed to extract the formed procurement of the tube from the cylindrical portions 1c. Then the procurement tube is dried in a dryer. Solvent vapors and other vapors formed during drying are removed by the evaporator. The dried two-dimensional polymer tube 6 is rolled into rolls. The dryer and evaporator are not shown in the FIG. 1.

The disclosed reactor comprises a first viscosity regulation container 12 containing inert substances and a first viscosity sensor 13 designed to control and regulate the viscosity of solution A. If solution A uses a polar solvent, such as water, container 12 may introduce polyethylene glycol into the reaction vessel to increase the viscosity of solution A in response to a signal from the viscosity sensor 13. Similarly, a second viscosity regulation container 14 containing inert substances and a second viscosity sensor 15 is provided for the solution B. By way of example, and not by way of limitation, if solution B uses a non-polar solvent, such as chloroform, container 14 may introduce chlorinated ethylene to increase the viscosity of solution B. By way of example, and not by way of limitation, the viscosity sensors 13 and 15 may be a surface acoustic wave sensor in which an oscillating plate is placed in contact with solution A and B, accordingly. The oscillating plate is driven to oscillate laterally at a fixed frequency. Power loss occurring to the solution when the oscillating plate is in contact with to solution can be related to the viscosity of the solution.

The main factor influencing the process of percolation (seepage) of solutions A and B through membranes 16a and 16b are the pressures in the first portion 1a and the second portion 1b. There are values of the allowable pressures in these portions, due to this values, the operation of the reactor is ensured. If the pressure in the first portion 1a is less than the set value, a pressure control device (pump) 17 increases it. Therefore, the disclosed reactor has an automatic pressure control system: a pressure sensor 18 and various types of connectors. If the pressure increases above the set value, the membrane 16a will collapse. In this case, pressure control device 17 should reduce the pressure in response to a signal from the pressure sensor 18. Similarly, the pressure of the solution in the second portion 1b is regulated using the pressure control device 20 and the pressure sensor 21.

The second important factor is the temperatures of the solutions A and B. When the temperature increases, the viscosity and density of the solutions A and B decreases, which means that the membranes begin to work more effectively. The pressure increases with temperature, so this parameter also has its own limitations. A temperature regulating device such, a heating element and/or cooling element may be disposed inside the reaction vessel or coupled to the outside of the reaction vessel and configured to transmit or extract heat from the solutions within the reaction vessel.

An important limiter of the membrane is the rate of clogging of its pores. Clogging of the membrane typically occurs for two reasons. In the first case, particles larger than the pores overlap the pore mouths. The worst case here is when the size of the particle and the pore mouth are almost the same, because such a particle can approach the pore and completely block it. Blocking the pore with a much larger particle is less dangerous, since liquid flow is still possible to bypass the particle. In the second case, jumpers are formed when particles of significantly smaller sizes than the pores stick to each other, as well as to the edges of the pore. During the seepage of the solution, these jumpers completely cover the hole of the pore. The lower the membrane clogging rate, the greater the volume of solution that can be passed before the membrane needs to be cleaned or replaced.

Therefore, the reactor provides several stages of rough pre-treatment. The more powerful the pre-cleaning, the better. The clogging rate, which is expressed as a decrease in the flow rate of the solution through the membrane over time at the same pressure, is from a practical point of view one of the most important characteristics of the membrane.

Clogging pores can cause the formation of local inhomogeneities (irregularities) in the flows of the solutions A and B leaking through the membranes 16a and 16b. These flow inhomogeneities will lead to the formation of defects in the grown of the polymer tubing. To prevent this potential disadvantage of the polymer tubing, the device contains an acoustic wave generator 19 that excites the membranes 16a and 16b and thereby smooths the inhomogeneity of the flows of the solutions A and B through the membrane 16a and 16b and therefore prevents the formation of tubing defects.

Two-dimensional Polymer Tube Synthesis Example

In a reactor of the type described herein, it is possible to form a two-dimensional polymer tube based of chloroform and water in which 5,10,15,20-tetrakis (4-aminophenyl)-21H,23H-porphine (monomer 1) or 5,10,15,20-tetrakis (4-aminophenyl)-21H, 23H-porphyrin-Co(II) (monomer 2) and 2,5-dihydroxyterephthalaldehyde (monomer 3) are dissolved, respectively.

The thickness of the tube wall produced by reaction may be controlled by the width of the space between the two opposed permeable cylindrical membranes (the intermembrane space) in which solutions A and B interface with each other and allow a two-dimensional polymerization reaction to take place.

Growth of thickness of the tube walls 6 depends on the rate of seepage (percolation) of a solution A containing monomer reagent of the first type through the pores of the membrane 16a and the seepage (percolation) of a solution B containing monomer reagent of the second type through the pores of the membrane 16b, to the area between the membranes where both solutions A and B form of chemical bonds between the mentioned reagents, i.e., covalent bonds, ionic bonds, coordination bonds, and the like. The thickness of the tube wall may be therefore be controlled by controlling the time that the film 6 is allowed to be in the intermembrane space of solutions A and B. Other factors that affect film thickness include speed of removal of the tube 6 from the reaction vessel 1.

The length of the tube 6 may be arbitrary and depended partly on the tube walls thickness, and the availability of reactants for solutions A and B. Tubes of several tens of meters to several hundreds of meters or even several thousands of meters are envisaged.

What is claimed is:
1. A device comprising:
   a cylindrical reaction vessel having one or more permeable cylindrical membranes disposed therein separating the cylindrical reaction vessel into at least a first portion and a second portion, wherein the one or more permeable cylindrical membranes are configured to permit first reactants from a first solution in the first portion or second reactants from a second solution in the second portion to percolate or seep into a reaction zone proximate a surface of the one or more cylindrical membranes; and
   a lifting device (mechanism) located above the first portion of the cylindrical reaction vessel configured to continuously draw a preform two-dimensional polymer tube formed by continuous reaction of the first and second reactants out from the reaction zone.

2. The device of claim 1, wherein:
the one or more permeable cylindrical membranes include a first permeable cylindrical membrane and a second permeable cylindrical membrane inside of the reaction cylindrical vessel and separating the reaction vessel into the first portion and the second portion, where the first permeable cylindrical membrane is coaxially located inside of the second permeable cylindrical membrane such that an inter-membrane space between the first permeable cylindrical membrane and the second permeable cylindrical membrane forms the reaction zone, wherein the first permeable cylindrical membrane is configured to permit the first reactants to percolate or seep from the first portion into the inter-membrane space and wherein the second permeable cylindrical membrane is configured to permit the second reactants to percolate or seep from the second portion into the inter-membrane space; and
wherein the lifting device (mechanism) is located above the first portion of the cylindrical reaction vessel and is configured to continuously draw the preform two-dimensional polymer tube out of the inter-membrane space.

3. The device of claim 2, wherein the first permeable cylindrical membrane and the second permeable cylindrical membrane are porous, wherein the first permeable cylindrical membrane is characterized by a pore size chosen to selectively allow the first reactants through the first permeable cylindrical membrane, wherein the second permeable cylindrical membrane is characterized by a pore size chosen to selectively allow the second reactants through the second permeable cylindrical membrane respectively, wherein the pore size of the first permeable cylindrical membrane prevents the second reactants from traversing through the first permeable cylindrical membrane and the pore size of the second cylindrical membrane prevents the first reactants from traversing through the second permeable cylindrical membrane.

4. The device of claim 1, wherein the first portion and the second portion are isolated from each other.

5. The device of claim 1, further comprising a first liquid circulation loop and a second liquid circulation loop, wherein the first liquid circulation loop is configured to circulate the first solution through the inside of the first portion of the cylindrical reaction vessel and the second liquid circulation loop is configured to circulate the second solution through the inside of the second portion of the cylindrical reaction vessel and wherein the first and second liquid circulation loops operate separately from one another.

6. The device of claim 1, further comprising a first container coupled to the first portion and a second container coupled to the second portion wherein the first container is configured to hold the first solution and the second container is configured to hold the second solution and wherein the first and second containers are configured to provide their contents to the first portion and the second portion respectively.

7. The device of claim 1, further comprising an evaporator configured to remove solvent vapor that is generated during drying of the preform of the polymer tube.

8. The device of claim 7, further comprising a dryer configured to dry the preform of the polymer tube and wherein the dryer is located above the first portion of the cylindrical reaction vessel.

9. The device of claim 1, wherein the lifting device (mechanism) comprises clamping rollers configured to clamp onto the preform two-dimensional polymer tube, continuously pull the preform two-dimensional polymer tube through a drying chamber, and raise the edge of the preform two-dimensional polymer tube above the cylindrical reaction vessel.

10. The device of claim 1, further comprising a first viscosity regulation container and a first viscosity sensor coupled to the first portion and a second viscosity regulation container and second viscosity sensor coupled to the second portion, wherein the first and second viscosity regulation containers are configured to contain and add inert substances to the first and second portions respectively regulating the viscosity of the first or second solution and ensuring a laminar solution flow based on information from the first and second viscosity sensors.

11. The device of claim 1, further comprising a first pressure control device and a first pressure sensor coupled to the first portion and a second pressure control device and a second pressure sensor coupled to the second portion, wherein the first pressure control device and the second pressure control device are configured to regulate the pressure of the first solution and second solution respectively based on information from the first and second pressure sensors.

12. The device of claim 1, further comprising an acoustic wave generator configured to excite the one or more permeable cylindrical membranes.

13. A method for continuous creation of a polymer tube at a reaction vessel comprising:
reacting a first solution and a second solution, wherein the first solution includes a first reactant and the second solution includes a second reactant, wherein the first reactant and second reactant are selected to continuously generate a polymerization reaction in at least two dimensions when in contact with each other, including percolating the first reactant or the second reactant through a permeable cylindrical membrane to a reaction zone proximate a surface of the permeable cylindrical membrane;
contacting a polymerized preform polymer tube formed by continuous reaction of the first and second reactants in the reaction zone with a lifting device (mechanism); and
using the lifting device (mechanism) continuously drawing the polymerized preform polymer tube from the reaction zone.

14. The method of claim 13, wherein, a wall of the polymerized preform polymer tube is a multilayer porous polymer cylindrical film where each subsequent cylindrical layer is oriented relative to the previous cylindrical layers due to $\pi$-$\pi$-interaction.

15. The method of claim 13, further comprising, drying the polymerized preform polymer tube and evaporating the solvent vapor generated during drying with an evaporator.

16. The method of claim 13, wherein the lifting device (mechanism) includes clamping rollers continuously pulling the polymerized preform polymer tube through a drying chamber and raising an edge of dimensional polymerized preform polymer tube above the reaction vessel.

17. The method of claim 13, wherein, the polymerization reaction is continuously carried out due to chemical bonds selected from among: covalent bonds, ionic bonds, or coordination bonds.

18. The method of claim 13, wherein reacting the first solution and the second solution includes percolating the first reactant through the permeable cylindrical membrane into an inter-membrane space and percolating the second reactant through another cylindrical membrane into the inter-membrane space, the inter-membrane space between the the permeable cylindrical membrane and the other cylindrical membrane and serving as the reaction zone.

19. The method of claim 13, wherein, the first solution contains photovoltaic donor reagents and the second solution contains photovoltaic acceptor reagents, the photovoltaic donor reagents and the photovoltaic acceptor reagents forming donor-bridge-acceptor structures, followed by the formation of the polymer tube.

20. The method of claim 13 further comprising measuring the viscosity of the first solution, measuring the viscosity of the second solution, and adding an inert substance to the reaction regulating the viscosity of the first solution or the viscosity of the second solution and ensuring a laminar solution flow based on the measured viscosity of the first solution and the measured viscosity of the second solution.

21. The method of claim 13, wherein the first reactant includes 5,10,15,20-tetrakis(4-aminophenyl)-21H,23H-porphine and the second reactant includes 2,5-dihydroxyterephthalaldehyde.

22. The method of claim 13, wherein a shape of a cross-section of the polymer tube is selected from the list comprising circle (round), square, rectangular, oval, flat-oval and cross-shaped.

23. The method of claim 13, further comprising controlling pressure in the reaction zone.

24. The method of claim 13, further comprising exciting the permeable cylindrical membrane with an acoustic wave generator.

\* \* \* \* \*